(12) United States Patent
Iwata

(10) Patent No.: US 7,427,578 B2
(45) Date of Patent: *Sep. 23, 2008

(54) METHOD FOR PRODUCING HYDROREFINING CATALYST

(75) Inventor: Yoshiki Iwata, Toda (JP)

(73) Assignee: Japan Energy Corporation, Tokyo (JP)

( * ) Notice: Subject to any disclaimer, the term of this patent is extended or adjusted under 35 U.S.C. 154(b) by 341 days.

This patent is subject to a terminal disclaimer.

(21) Appl. No.: 10/525,841

(22) PCT Filed: Aug. 29, 2003

(86) PCT No.: PCT/JP03/11025

§ 371 (c)(1),
(2), (4) Date: Feb. 25, 2005

(87) PCT Pub. No.: WO2004/020090

PCT Pub. Date: Mar. 11, 2004

(65) Prior Publication Data

US 2005/0266985 A1    Dec. 1, 2005

(30) Foreign Application Priority Data

Aug. 30, 2002    (JP)    .............. 2002-252261

(51) Int. Cl.
*B01J 27/00* (2006.01)
*B01J 27/188* (2006.01)
*B01J 27/19* (2006.01)

(52) U.S. Cl. .................. 502/208; 502/210; 502/211

(58) Field of Classification Search ............ 502/208, 502/210, 211
See application file for complete search history.

(56) References Cited

U.S. PATENT DOCUMENTS

| 3,840,472 | A | 10/1974 | Colgan et al. | |
| 5,494,568 | A | 2/1996 | Simpson et al. | |
| 5,906,731 | A | 5/1999 | Abdo et al. | |
| 6,015,485 | A * | 1/2000 | Shukis et al. | .......... 208/112 |
| 6,332,976 | B1 | 12/2001 | Mignard et al. | |
| 6,689,712 | B1 | 2/2004 | Tanaka | |
| 6,903,048 | B2 * | 6/2005 | Iwata et al. | .......... 502/211 |

FOREIGN PATENT DOCUMENTS

| CA | 2 370 726 A1 | 10/2000 |
| EP | 1 172 141 A1 | 1/2002 |
| GB | 1 401 495 | 7/1975 |
| JP | 4-265158 A | 9/1992 |
| JP | 6-277520 A | 10/1994 |
| JP | 2575168 B2 | 10/1996 |
| JP | 2000-42413 A | 2/2000 |
| WO | WO-95/09049 A3 | 4/1995 |

* cited by examiner

*Primary Examiner*—Elizabeth D Wood
(74) *Attorney, Agent, or Firm*—Birch, Stewart, Kolasch & Birch, LLP

(57) ABSTRACT

A method for producing a hydrorefining catalyst includes the step of preparing a carrying solution containing molybdenum, phosphorus, and cobalt or nickel and bringing a carrier composed of an inorganic porous oxide into contact with the carrying solution. A molar ratio of molybdenum with respect to phosphorus in the carrying solution is 2.5 to 7.0, a molar ratio of a total of molybdenum, cobalt, and nickel with respect to phosphorus is 3.5 to 9.0, and a molar ratio of molybdenum with respect to a total of cobalt and nickel is 1.9 to 2.8. pH of the carrying solution is 2 to 5, and a Raman spectroscopy spectrum of the carrying solution has a peak top between 965 $cm^{-1}$ and 975 $cm^{-1}$. The catalyst obtained by this method is excellent in desulfurizing activity.

12 Claims, 7 Drawing Sheets

METHOD FOR PRODUCING HYDROREFINING CATALYST

TECHNICAL FIELD

The present invention relates to a method for producing a hydrorefining catalyst to be used, for example, for desulfurization and denitrogenation of hydrocarbon oil such as petroleum. In particular, the present invention relates to a method for carrying a hydrogenation-active metal.

BACKGROUND ART

Conventionally, a hydrorefining catalyst has been produced such that a carrier, which is composed of a porous inorganic oxide such as alumina, is allowed to carry an active metal which has, for example, a desulfurizing ability, a demetallation ability, and/or a hydrogenation ability. The hydrorefining is performed by contacting the hydrocarbon oil and the hydrorefining catalyst with each other in the presence of hydrogen, in which it is possible to remove the heteroelements contained in the hydrocarbon oil, i.e., sulfur, nitrogen, and metal elements (for example, vanadium, nickel, and iron). A variety of investigations have been made for the catalyst as described above in relation to the active metal, the properties of the carrier, the pore structure, and the method for carrying the active metal in order to improve the ability to remove the heteroelements.

As for the carrying solution, it has been investigated to blend, for example, metal salt, organic acid, and/or inorganic acid in order to stably dissolve the metal component. For example, Japanese Patent Application Laid-open No. 6-277520 discloses a method for producing a hydrodesulfurizing catalyst which is based on the use of a carrying solution containing a composite acid salt such as those of molybdophosphoric acid and a carbonate such as those of cobalt. Japanese Patent No. 2575168 discloses a method for producing a hydrotreating catalyst which is based on the use of a carrying solution containing molybdenum oxide, nickel carbonate, phosphoric acid, and mercaptocarboxylic acid. Japanese Patent Application Laid-open No. 4-265158 discloses a method for preparing a hydrogenation catalyst which is based on the use of a carrying solution containing cobalt carbonate, phosphoric acid, molybdenum oxide, and nitric acid. U.S. Pat. No. 3,840,472 discloses a stable carrying solution which contains a small amount of phosphorus and which is obtained by adding nickel carbonate and molybdenum oxide to a phosphoric acid solution followed by being refluxed.

The present applicant has disclosed, in Japanese Patent Application Laid-open No. 2000-42413, a method for preparing a hydrorefining catalyst which is based on the use of a carrying solution containing ammonium molybdate, cobalt carbonate, nickel carbonate, phosphoric acid, and citric acid. This carrying solution uses a relatively large amount of citric acid. For this reason, a complex, which is intended in the present invention, is not formed. As a result, the activity of the obtained catalyst is not sufficient.

DISCLOSURE OF THE INVENTION

An object of the present invention is to provide a catalyst which has a more excellent activity by improving the composition of a carrying solution, especially a carrying solution having a relatively small content of phosphoric acid.

As a result of diligent studies performed by the present inventors in order to achieve the object as described above, it has been found out that a catalyst having excellent desulfurizing performance is successfully prepared by using a carrying solution which has a specified pH and which has a composition ratio among molybdenum, phosphorus, and cobalt or nickel, the composition ratio being within a specified range.

That is, according to the present invention, there is provided a method for producing a hydrorefining catalyst containing molybdenum, phosphorus, and cobalt or nickel by bringing a carrying solution into contact with a carrier composed of an inorganic porous oxide; the method comprising the step of preparing the carrying solution containing molybdenum, phosphorus, and cobalt or nickel and bringing the carrier into contact with the carrying solution; wherein a molar ratio of molybdenum with respect to phosphorus in the carrying solution is 2.5 to 7.0, a molar ratio of a total of molybdenum, cobalt, and nickel with respect to phosphorus is 3.5 to 9.0, and a molar ratio of molybdenum with respect to a total of cobalt and nickel is 1.9 to 2.8; pH of the carrying solution is 2 to 5; and a Raman spectroscopy spectrum of the carrying solution has a peak top between 965 $cm^{-1}$ and 975 $cm^{-1}$.

It is preferable that the production method of the present invention further comprises a step of performing calcination in an oxidizing atmosphere after the step of bringing the carrier into contact with the carrying solution. It is preferable that the Raman spectroscopy spectrum of the carrying solution has a peak top between 935 $cm^{-1}$ and 945 $cm^{-1}$, and the peak top between 965 $cm^{-1}$ and 975 $cm^{-1}$ is higher than the peak top between 935 $cm^{-1}$ and 945 $cm^{-1}$. It is preferable that the Raman spectroscopy spectrum of the carrying solution has a peak top between 1040 $cm^{-1}$ and 1050 $cm^{-1}$ which is lower than the peak top between 965 $cm^{-1}$ and 975 $cm^{-1}$, or the Raman spectroscopy spectrum of the carrying solution has no peak top between 1040 $cm^{-1}$ and 1050 $cm^{-1}$. It is preferable that the molar ratio of molybdenum with respect to phosphorus in the carrying solution is 4.1 to 6.5, the molar ratio of the total of molybdenum, cobalt, and nickel with respect to phosphorus is 5.0 to 9.0, and pH of the carrying solution is 3 to 5.

Carrier

Figure 1:
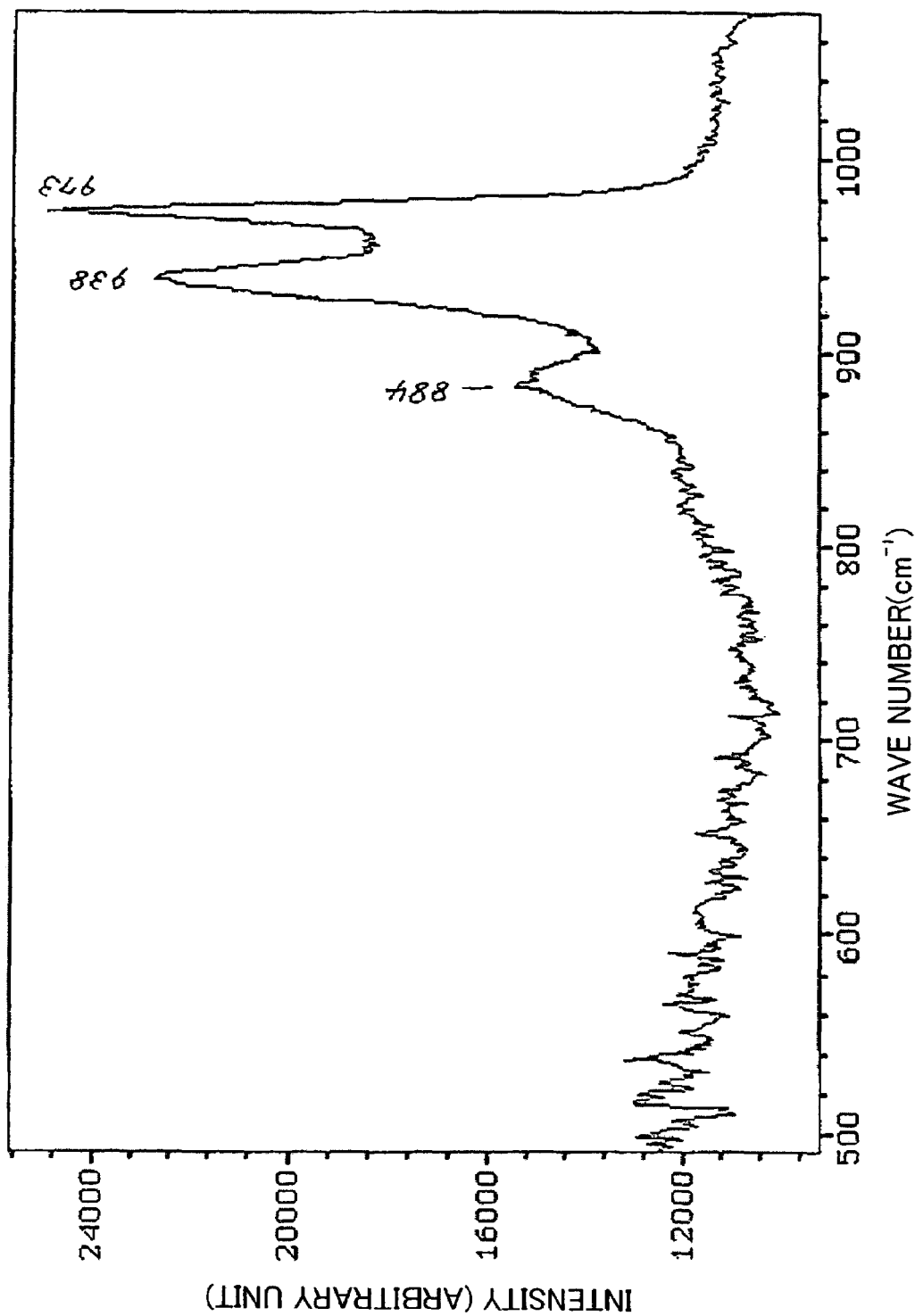
FIG. 1 shows a Raman spectroscopy spectrum of Carrying Solution 6605.

Any carrier may be used for the catalyst without any problem provided that the carrier is prepared with an inorganic substance which is generally used for the catalyst carrier. The carrier is exemplified, for example, by those composed of oxides of elements belonging to Group II, Group III, or Group IV in the periodic table. In particular, it is possible to use at least one of oxides including, for example, silica, alumina, magnesia, zirconia, boria, titania, calcia, and zinc oxide. Among them, it is preferable to use those composed of, for example, alumina (having respective crystalline structures of, for example, α, γ, δ, ζ, and χ), silica-alumina, silica, alumina-magnesia, silica-magnesia, and alumina-silica-magnesia, especially those composed of γ-alumina. The catalyst, which is usable without any trouble, may have any shape including, for example, those having spherical, columnar, trilobe, and quadrilobe forms.

The nature of the carrier, which is preferred for the hydrorefining catalyst for the middle distillate products including, for example, the kerosene distillate product, the gas oil distillate product, and the vacuum gas oil distillate product, is as follows. The specific surface area measured by the nitrogen adsorption method is 100 to 400 m$^2$/g and especially preferably not less than 200 m$^2$/g. The pore volume is 0.3 to 1 cm$^3$/g and especially preferably not less than 0.5 cm$^3$/g. The median pore diameter is 3 to 20 nm and especially preferably 4 to 12 nm. The middle distillate products herein mean the distillate products having 50% distillation temperatures of less than 480° C. Usually, the 90% distillation temperatures of the middle distillate products are not more than 580° C. Usually, the vacuum gas oil distillate product is the distillate product which has the 50% distillation temperature of 360 to 460° C. and the 90% distillation temperature of 460 to 560° C.

The nature of the carrier, which is preferred for the hydrorefining catalyst for the heavy oil is as follows. The specific surface area measured by the nitrogen adsorption method is preferably 100 to 400 m$^2$/g and especially preferably not less than 150 m$^2$/g. The pore volume measured by the nitrogen adsorption method is preferably 0.3 to 1 cm$^3$/g and especially preferably not less than 0.5 cm$^3$/g. The median pore diameter is preferably 3 to 20 nm and especially preferably 7 to 20 nm. The heavy oil herein means the distillate product which contains the residual ash content by not less than 1%, which is exemplified, for example, by the atmospheric distillation residue and the vacuum distillation residue.

Carrying Solution

The composition of the carrying solution to be used for the present invention is as follows. That is, the molar ratio of molybdenum with respect to phosphorus (value obtained by dividing the molar number of molybdenum contained in the carrying solution by the molar number of phosphorus, hereinafter referred to as "ratio of Mo/P" as well) is 2.5 to 7.0. The molar ratio of the total of molybdenum, cobalt, and nickel with respect to phosphorus (value obtained by dividing the molar number of the total of molybdenum, cobalt, and nickel contained in the carrying solution by the molar number of phosphorus, hereinafter referred to as "ratio of (Mo+Co+Ni)/P" as well) is 3.5 to 9.0. The molar ratio of molybdenum with respect to the total of cobalt and nickel (value obtained by dividing the molar number of molybdenum contained in the carrying solution by the molar number of the total of cobalt and nickel, hereinafter referred to as "ratio of Mo/(Co+Ni)" as well) is 1.9 to 2.8. In particular, it is preferable that the molar ratio of molybdenum with respect to phosphorus is 4.1 to 6.5, and the molar ratio of the total of molybdenum, cobalt, and nickel with respect to phosphorus is 5.0 to 9.0. It is preferable that the molar ratio of molybdenum with respect to the total of cobalt and nickel is 2.2 to 2.8. The carrying solution to be used for the present invention has pH which is 2 to 5 and preferably 3 to 5.

Molybdenum can be added as a compound including, for example, oxides, ammonium salts, and chlorides to the carrying solution. The concentration thereof is 0.1 to 6 mole/liter and especially preferably 0.2 to 3 mole/liter. Cobalt and nickel can be added as compounds including, for example, carbonates, nitrates, and chlorides to the carrying solution. The concentrations thereof are 0.1 to 3 mole/liter and especially preferably 0.05 to 2 mole/liter. Phosphorus can be added as a compound including, for example, phosphoric acid, phosphorous acid, ammonium phosphate, and phosphomolybdic acid to the carrying solution. The concentration thereof is 0.01 to 2 mole/liter and especially preferably 0.05 to 1 mole/liter. Within the scope of the present invention, it is also allowable to add, to the carrying solution, for example, reducing agents, oxidizing agents such as hydrogen peroxide and permanganate, and water-soluble polymers such as polyethylene glycol and polyvinyl alcohol. It is preferable that inorganic acid and organic acid other than phosphoric acid are not added.

The carrying solution to be used for the present invention has the peak in the vicinity of 970 cm$^{-1}$ (965 to 975 cm$^{-1}$, especially 970 to 975 cm$^{-1}$) in the Raman spectroscopy spectrum. It is considered that the peak does not result from molybdophosphoric acid ion but the peak results from any complex ion containing, in a specified ratio, cobalt or nickel, molybdenum, and phosphorus.

When organic acid such as citric acid is contained, a peak appears in the vicinity of 940 cm$^{-1}$ (935 to 945 cm$^{-1}$), probably for the following reason. That is, it is considered that any complex containing organic acid is formed. However, it is preferable that the peak as described above is smaller than the peak in the vicinity of 970 cm$^{-1}$, especially the peak as described above is substantially undetectable (with a height of not more than 10% of that of the peak in the vicinity of 970 cm$^{-1}$). When nitric acid is contained, a peak appears in the vicinity of 1045 cm$^{-1}$ (1040 to 1050 cm$^{-1}$), probably for the following reason. That is, it is considered that the peak results from nitric acid ion. However, it is preferable that the peak as described above is smaller than the peak in the vicinity of 970 cm$^{-1}$, especially the peak as described above is substantially undetectable (with a height of not more than 10% of that of the peak in the vicinity of 970 cm$^{-1}$).

Carrying Method

In the present invention, it is preferable to perform the calcination in the oxidizing atmosphere after bringing the carrier and the carrying solution into contact with each other. Those usable for the method for effecting the contact include methods which are known as the pore filling method and the impregnation method. In particular, the pore filling method is preferably used. The pore filling method is a method in which the carrying solution, which is in approximately the same amount as the pore volume of the carrier (in a volume of 0.2 to 5 times the pore volume), is brought into contact with the carrier uniformly by means of, for example, a method in which the carrying solution is allowed to be in a form of mist.

Those usable as the oxidizing atmosphere include atmospheres which contain sufficient amount of air or oxygen. The calcination is performed within a temperature range of 400 to 800° C., preferably 400 to 600° C., and especially preferably 450 to 550° C. The temperature-raising time until arrival at the calcination temperature is preferably 10 to 240 minutes. The holding time at the calcination temperature is preferably 1 to 240 minutes. Preferably, the drying operation is performed before the calcination. The drying operation is performed usually within a temperature range of 50 to 180° C. and preferably 80 to 150° C. for 10 minutes to 24 hours.

Hydrorefining Catalyst

The catalyst according to the present invention has the following preferred composition. That is, molybdenum is contained by 3 to 20% by weight and especially 7 to 18% by weight as represented by the metal element weight. Cobalt and nickel are contained by 0.5 to 8% by weight and especially 1 to 5% by weight as represented by the metal element weight. Phosphorus is contained by 0.1 to 5% by weight and especially 0.2 to 3% by weight as represented by the phosphorus element weight. The composition ratio of the respective components is approximately the same as the composition ratio in the carrying solution. Substantially no organic matter is contained in the catalyst before being used for the hydrorefining. Specifically, the content is not more than 0.2% by weight and especially not more than 0.1% by weight as represented by the carbon element weight.

The ratios of the respective carried components in the catalyst according to the present invention are uniform in the catalyst. In particular, the dispersion performance of phosphorus is excellent. Phosphorus forms any compound together with aluminum contained in the carrier after impregnating the carrier with the carrying solution. Therefore, the distribution is not changed even when the calcination is performed thereafter. The distribution in the carrying solution is reflected to the carrying solution as it is. As a result, phosphorus is uniformly distributed in the catalyst.

In the case of the hydrorefining catalyst to be used for the middle distillate products, the following ranges are preferably adopted. That is, the specific surface area measured by the nitrogen adsorption method is 50 to 350 $m^2/g$ and more preferably 150 to 300 $m^2/g$. The pore volume is 0.1 to 1 $cm^3/g$ and more preferably 0.3 to 0.8 $cm^3/g$. The median pore diameter is 3 to 20 nm and more preferably 4 to 12 nm.

In the case of the hydrorefining catalyst to be used for the heavy oil, the following ranges are preferably adopted. That is, the specific surface area measured by the nitrogen adsorption method is 50 to 350 $m^2/g$ and more preferably 150 to 300 $m^2/g$. The pore volume is 0.1 to 1 $cm^3/g$ and more preferably not less than 0.3 $cm^3/g$. The median pore diameter is 3 to 20 nm and more preferably 7 to 20 nm.

In relation to the shape of the catalyst, those usable include columnar or prism-shaped, spherical, and tablet-shaped forms. However, the columnar shape is used especially preferably. The cross-sectional shape of the columnar product may be any one of, for example, circular, trilobe, and quadrilobe shapes. As for the cross-sectional size, those having diameters of 0.1 mm to 10 mm are usable. However, the diameter is preferably 0.7 to 3 mm. The catalyst is subjected to a sulfurizing treatment by making contact with a sulfur-containing compound prior to the use. The sulfur-containing compound to be used includes, for example, carbon disulfide, dimethyl disulfide, butylmercaptan, and dimethylmercaptan. The sulfurizing treatment is performed before filling the reactor with the catalyst or after filling the reactor with the catalyst.

Hydrorefining

The catalyst according to the present invention is usable for the hydrorefining which uses feed oil including, for example, straight run or cracked middle distillate products, naphtha, kerosene, vacuum gas oil, heavy oil, and residue. The catalyst according to the present invention is preferably usable for feed oil of straight run or cracked middle distillate products, especially vacuum gas oil. Further, the catalyst according to the present invention is preferably usable for feed oil of heavy oil including, for example, atmospheric distillation residue and vacuum distillation residue.

The hydrorefining condition according to the present invention can be appropriately selected from the following ranges. That is, the reaction temperature is 250 to 500° C. and more preferably 300 to 450° C. The reaction pressure is 1 to 30 MPa and preferably 3 to 20 MPa. The flow rate of hydrogen is 50 to 5000 L/L and more preferably 100 to 2000 L/L as represented by the hydrogen/oil ratio. The liquid space velocity (LHSV) is 0.1 to 10/hour and more preferably 0.2 to 5/hour.

EXAMPLES

The present invention will be explained in more detail below as exemplified by Examples. However, Examples do not limit the scope of the present invention.

Preparation of Carrying Solution 3.6 g of 85% phosphoric acid (produced by Kanto Kagaku) was added to 60 g of ion exchange water, followed by being heated to 80° C. 39.5 g of molybdenum trioxide (produced by Taiyo Koko Co., Ltd.), 9.7 g of 45.6% cobalt carbonate (produced by Kansai Catalyst Co., Ltd.), and 4.8 g of 45.0% nickel carbonate (produced by Nihon Kagaku Sangyo Co., Ltd.) were added, followed by being dissolved while performing agitation at 80° C. Further, 3.6 g of 85% phosphoric acid was added, followed by being left to stand so that cooling was effected to arrive at room temperature. Thus, Carrying Solution 6605 having pH 3.4 was obtained.

3.1 g of 85% phosphoric acid (produced by Kanto Kagaku) was added to 60 g of ion exchange water, followed by being heated to 80° C. 39.3 g of molybdenum trioxide (produced by Taiyo Koko Co., Ltd.), 9.7 g of 45.6% cobalt carbonate (produced by Kansai Catalyst Co., Ltd.), and 4.7 g of 45.0% nickel carbonate (produced by Nihon Kagaku Sangyo Co., Ltd.) were added, followed by being dissolved while performing agitation at 80° C. Further, 3.2 g of 85% phosphoric acid was added, followed by being left to stand so that cooling was effected to arrive at room temperature. Thus, Carrying Solution 5207 having pH 4.1 was obtained.

3.6 g of 85% phosphoric acid (produced by Kanto Kagaku) was added to 60 g of ion exchange water, followed by being heated to 80° C. 39.1 g of molybdenum trioxide (produced by Taiyo Koko Co., Ltd.), 9.6 g of 45.6% cobalt carbonate (produced by Kansai Catalyst Co., Ltd.), and 4.7 g of 45.0% nickel carbonate (produced by Nihon Kagaku Sangyo Co., Ltd.) were added, followed by being dissolved while performing agitation at 80° C. Further, 1.1 g of 85% phosphoric acid was added, followed by being left to stand so that cooling was effected to arrive at room temperature. Thus, Carrying Solution 6614 having pH 4.9 was obtained.

5.4 g of 85% phosphoric acid (produced by Kanto Kagaku) was added to 60 g of ion exchange water, followed by being heated to 80° C. 40.0 g of molybdenum trioxide (produced by Taiyo Koko Co., Ltd.), 9.9 g of 45.6% cobalt carbonate (produced by Kansai Catalyst Co., Ltd.), and 4.8 g of 45.0% nickel carbonate (produced by Nihon Kagaku Sangyo Co., Ltd.) were added, followed by being dissolved while performing agitation at 80° C. Further, 5.4 g of 85% phosphoric acid was added, followed by being left to stand so that cooling was effected to arrive at room temperature. Thus, Carrying Solution 6618 having pH 2.3 was obtained.

6.9 g of 85% phosphoric acid (produced by Kanto Kagaku) was added to 60 g of ion exchange water, followed by being heated to 80° C. 40.3 g of molybdenum trioxide (produced by Taiyo Koko Co., Ltd.), 9.1 g of 45.6% cobalt carbonate (produced by Kansai Catalyst Co., Ltd.), and 4.4 g of 45.0% nickel carbonate (produced by Nihon Kagaku Sangyo Co., Ltd.) were added, followed by being dissolved while performing agitation at 80° C. Further, 6.9 g of 85% phosphoric acid was added, followed by being left to stand so that cooling was effected to arrive at room temperature. Thus, Carrying Solution 5209 having pH 1.1 was obtained.

3.6 g of 85% phosphoric acid (produced by Kanto Kagaku) was added to 60 g of ion exchange water, followed by being heated to 80° C. 39.5 g of molybdenum trioxide (produced by Taiyo Koko Co., Ltd.), 9.7 g of 45.6% cobalt carbonate (produced by Kansai Catalyst Co., Ltd.), and 4.8 g of 45.0% nickel carbonate (produced by Nihon Kagaku Sangyo Co., Ltd.) were added, followed by being dissolved while performing agitation at 80° C. Further, 3.6 g of 85% phosphoric acid was added, followed by being left to stand so that cooling was effected to arrive at room temperature. After that, 30.0 g of citric acid (produced by Kanto Kagaku) was added. Thus, Carrying Solution 6607 having pH 0.6 was obtained.

7.1 g of 85% phosphoric acid (produced by Kanto Kagaku) and 30.0 g of citric acid (produced by Kanto Kagaku) were added to 60 g of ion exchange water, followed by being heated to 80° C. 9.7 g of 45.6% cobalt carbonate (produced by Kansai Catalyst Co., Ltd.) and 4.8 g of 45.0% nickel carbonate (produced by Nihon Kagaku Sangyo Co., Ltd.) were added, followed by being left to stand so that cooling was effected to arrive at room temperature. 48.9 g of ammonium heptamolybdate (produced by Wako Pure Chemical Industries, Ltd., $(NH_4)_6Mo_7O_{24} \cdot 4H_2O$), followed by being dissolved. Thus, Carrying Solution 6610 having pH 3.7 was obtained.

Evaluation of Carrying Solution

Figure 2:
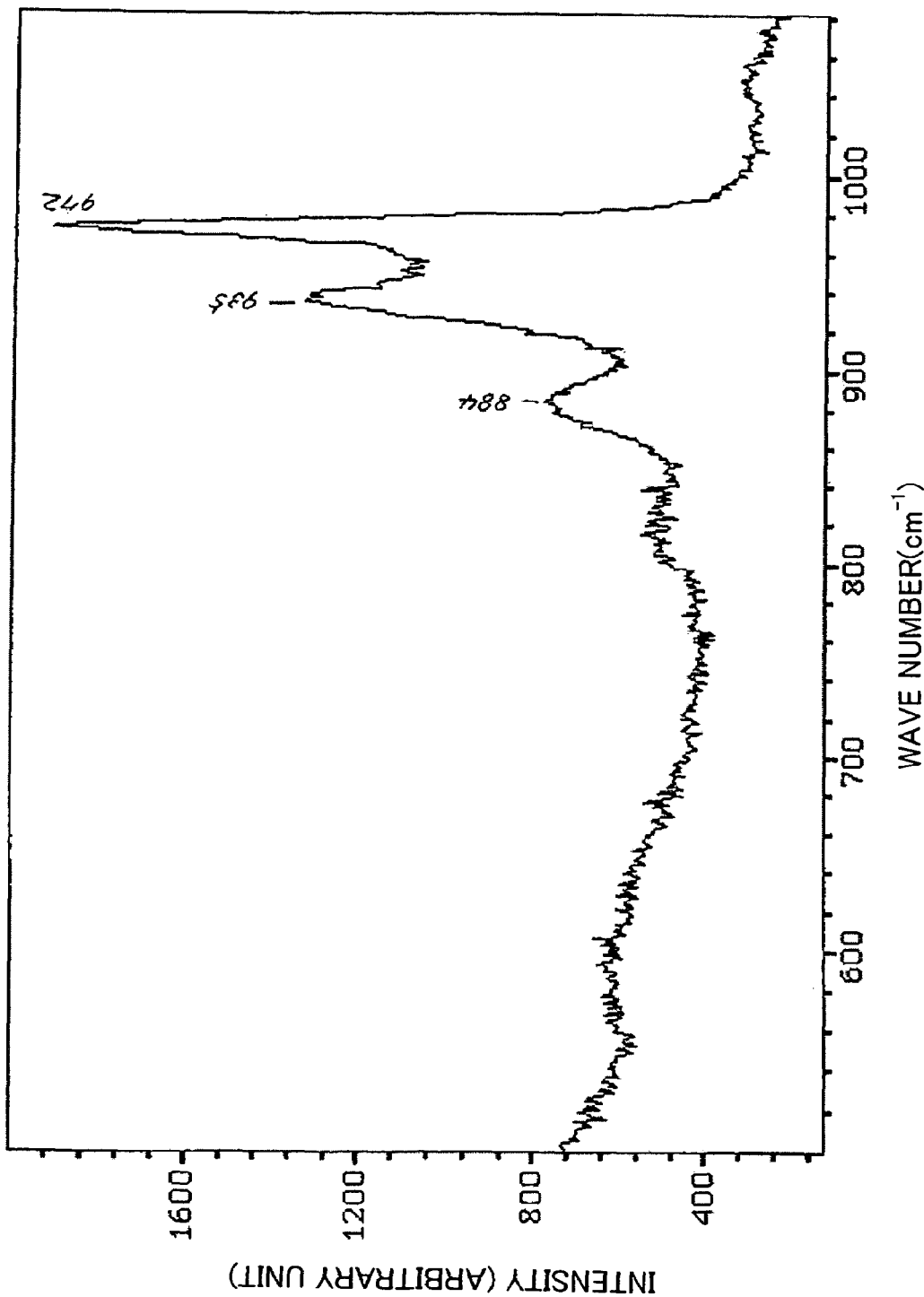
FIG. 2 shows a Raman spectroscopy spectrum of Carrying Solution 5207.
Figure 3:
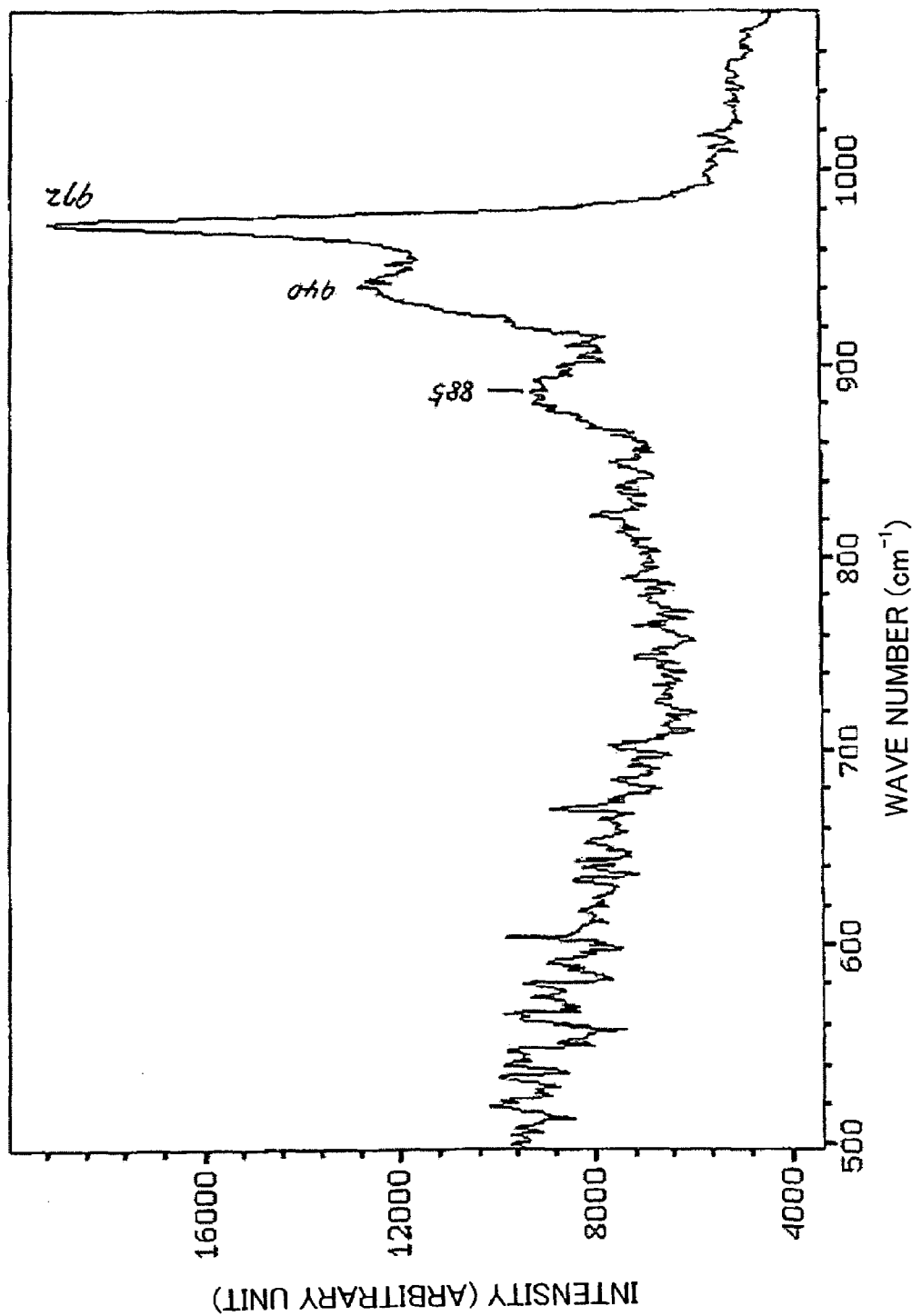
FIG. 3 shows a Raman spectroscopy spectrum of Carrying Solution 6614.
Figure 4:
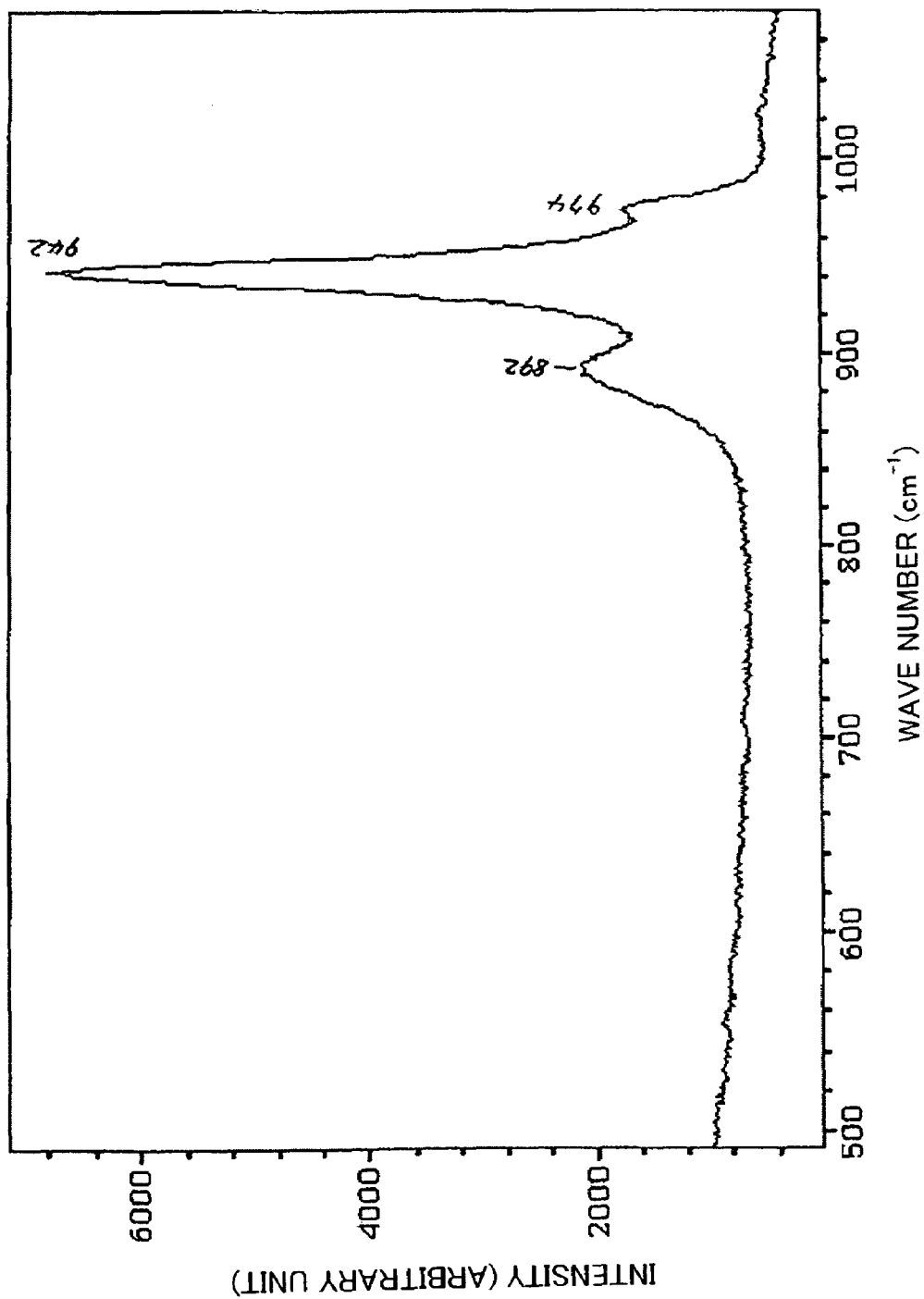
FIG. 4 shows a Raman spectroscopy spectrum of Carrying Solution 6618.
Figure 5:
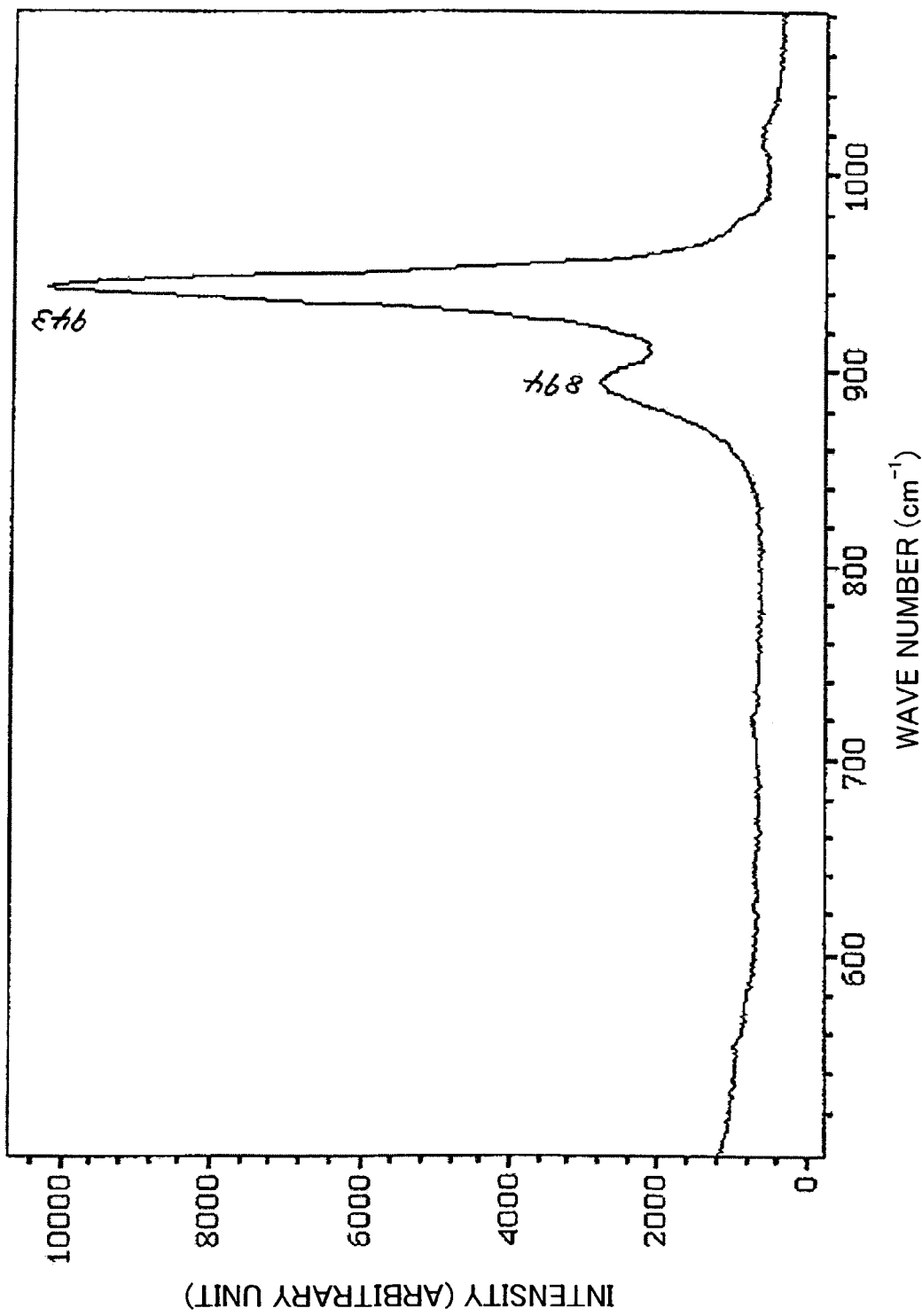
FIG. 5 shows a Raman spectroscopy spectrum of Carrying Solution 5209.
Figure 6:
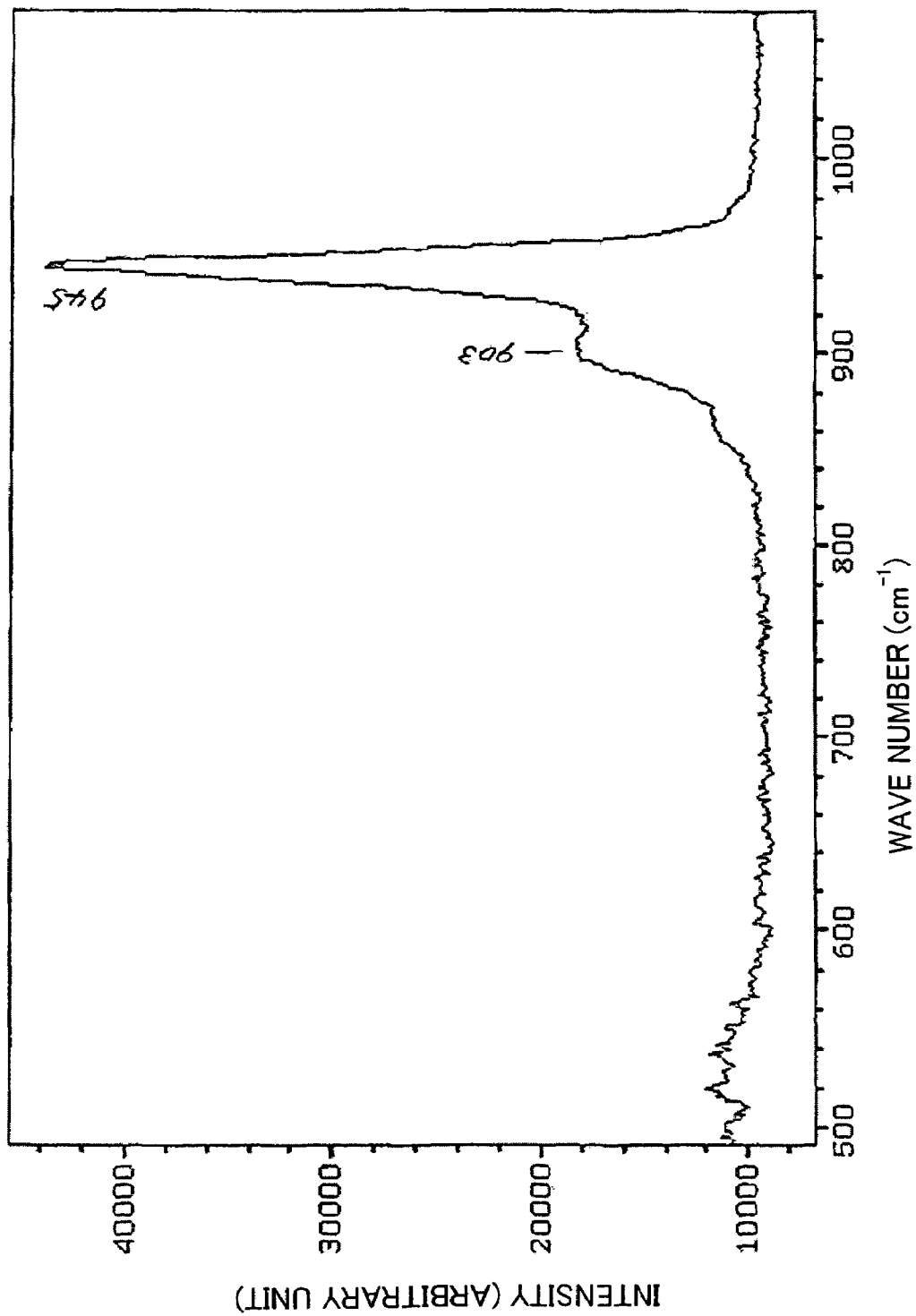
FIG. 6 shows a Raman spectroscopy spectrum of Carrying Solution 6607.
Figure 7:
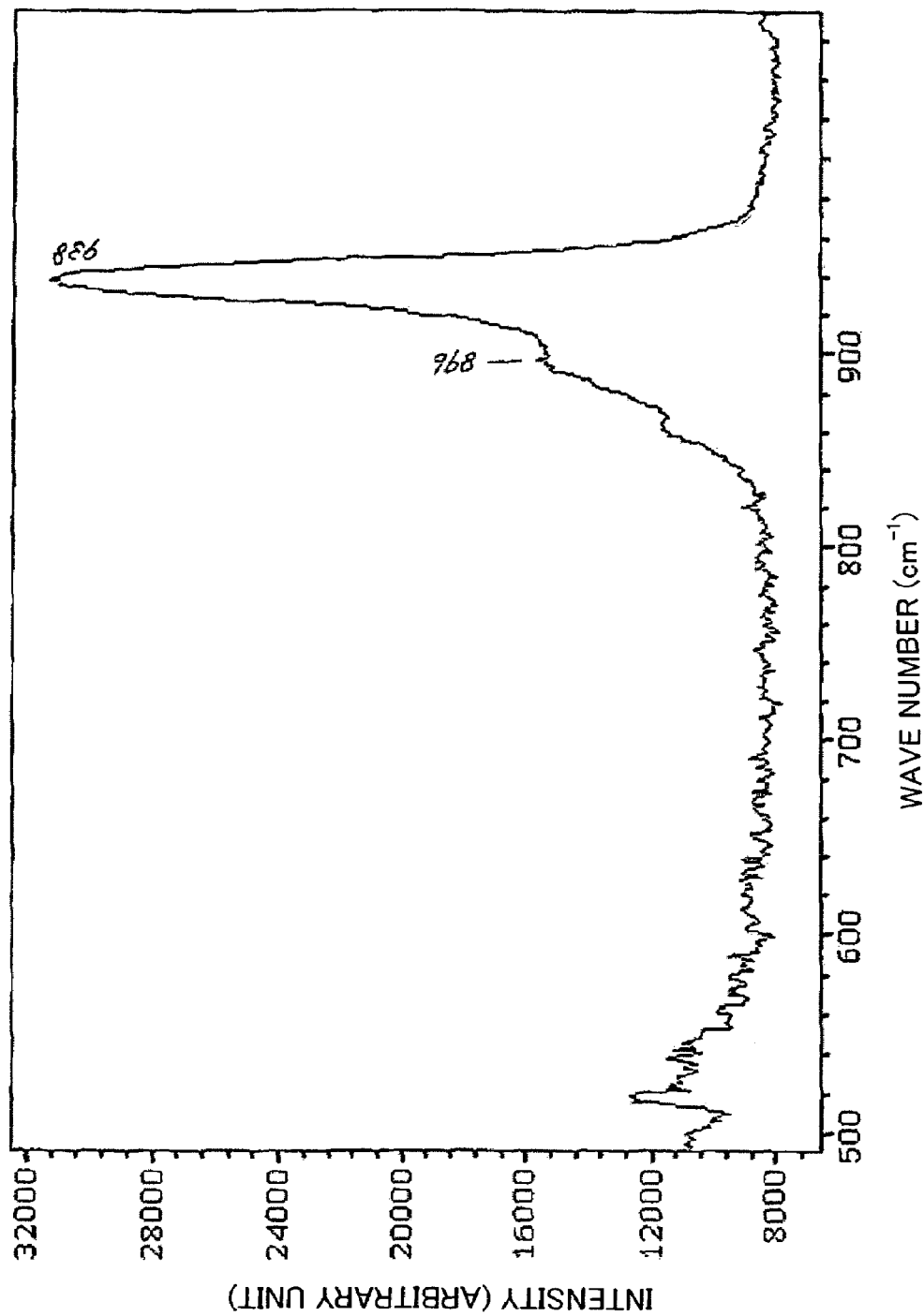
FIG. 7 shows a Raman spectroscopy spectrum of Carrying Solution 6610.

The carrying solutions were evaluated by means of the Raman spectroscopy. An He-Ne laser was used in SYSTEM-1000 type Micro-Raman produced by RENISHAW. Signals were added-up to perform the measurement at a resolution of 2 $cm^{-1}$ with a measuring spot of 10 μmφ for an exposure time of 60 seconds. Results of the measurement of Carrying Solutions 6605, 5207, 6614, 6618, 5209, 6607, and 6610 are shown in FIGS. 1 to 7 respectively.

The molar ratio of molybdenum with respect to phosphorus (ratio of Mo/P), the molar ratio of the total of molybdenum, cobalt, and nickel with respect to phosphorus (ratio of (Mo+Co+Ni)/P), the molar ratio of molybdenum with respect to the total of cobalt and nickel (ratio of Mo/(Co+Ni)), pH, and the peak top in the Raman spectroscopy are summarized for the respective carrying solutions in Table 1. In Table 1, the term "weak" indicates the peak which has the height of not more than 10% of the height of the "strong" peak. No peak was found between 1040 and 1050 $cm^{-1}$ for all of the carrying solutions.

Two peak tops of the Raman spectroscopy are obtained between 935 and 945 $cm^{-1}$ and between 970 and 975 $cm^{-1}$ when the molar ratio of molybdenum/phosphorus is 2.5 to 7.0, the molar ratio of the total of molybdenum, cobalt, and nickel with respect to phosphorus is 3.5 to 9.0, the molar ratio of molybdenum with respect to the total of cobalt and nickel is 2.2 to 2.8, no organic acid is contained, and pH of the carrying solution is 2 to 5.

It is appreciated that two peak tops of the Raman spectroscopy are obtained between 935 and 945 $cm^{-1}$ and between 970 and 975 $cm^{-1}$ and the peak top between 970 and 975 $cm^{-1}$ is more intense (higher) than the peak top between 935 and 945 $cm^{-1}$ when the molar ratio of molybdenum with respect to phosphorus is 4.1 to 6.5, the molar ratio of the total of molybdenum, cobalt, and nickel with respect to phosphorus is 5.9 to 9.0, the molar ratio of molybdenum with respect to the total of cobalt and nickel is 2.2 to 2.8, no organic acid is contained, and pH of the carrying solution is 3 to 5.

TABLE 1

|  |  | Carrying Solution # | | | | | | |
|---|---|---|---|---|---|---|---|---|
|  |  | #6605 | #5207 | #6614 | #6618 | #5209 | #6607 | #6610 |
| Molar ratio | Ratio of Mo/P | 4.29 | 5.04 | 6.30 | 2.82 | 2.19 | 4.32 | 4.12 |
|  | Ratio of (Mo + Co + Ni)/P | 6.03 | 7.05 | 8.96 | 3.97 | 3.03 | 6.14 | 5.84 |
|  | Ratio of Mo/(Co + Ni) | 2.47 | 2.51 | 2.37 | 2.46 | 2.60 | 2.36 | 2.41 |
| pH |  | 3.4 | 4.1 | 4.9 | 2.3 | 1.1 | 0.6 | 3.7 |
| Peak top of Raman Spectroscopy | 935 to 945 $cm^{-1}$ | weak | weak | weak | strong | strong | strong | strong |
|  | 965 to 975 $cm^{-1}$ | strong | strong | strong | weak | none | none | none |

Preparation of Catalyst

Catalyst carriers were impregnated with the carrying solutions shown in Table 1 by means of the pore filling method respectively. Each of the catalyst carriers was 1/16" trilobe pellet-shaped, and it contained a major component of γ-alumina. The specific surface area measured by the nitrogen adsorption method was 251 to 262 $m^2/g$, the pore volume was 0.65 to 0.66 $cm^3/g$ within a range of pore diameters of 2 to 60 nm, and the median pore diameter was 7.8 to 8.3 nm. The impregnated matters were dried overnight at 130° C., followed by being calcinated at 500° C. for 30 minutes in air by using a ventilation type rotary kiln to prepare catalysts (Catalyst 6605, Catalyst 5207, Catalyst 6614, Catalyst 6618, Catalyst 5209, Catalyst 6607, and Catalyst 6610). The carrying solution, the specific surface area measured by the nitrogen adsorption method, the pore volume within the range of pore diameters of 2 to 60 nm, the median pore diameter, and the content of the carried metal are summarized in Table 2 for the catalysts.

TABLE 2

| | Catalyst # | | | | | | |
|---|---|---|---|---|---|---|---|
| | #6605 | #5207 | #6614 | #6618 | #5209 | #6607 | #6610 |
| Carrying Solution # | #6605 | #5207 | #6614 | #6618 | #5209 | #6607 | #6610 |
| Specific surface area ($m^2/g$) | 188 | 198 | 197 | 180 | 179 | 214 | 209 |
| Pore volume ($cm^3/g$) | 0.44 | 0.45 | 0.45 | 0.42 | 0.42 | 0.43 | 0.43 |
| Median pore diameter (nm) | 7.7 | 7.5 | 7.8 | 8.0 | 7.8 | 7.3 | 7.3 |
| Mo content (mass %) | 12.5 | 12.8 | 12.5 | 12.5 | 12.6 | 12.7 | 12.9 |
| Co content (mass %) | 2.09 | 2.13 | 2.18 | 2.09 | 1.97 | 2.22 | 2.21 |
| Ni content (mass %) | 1.02 | 1.00 | 1.05 | 1.03 | 1.00 | 1.10 | 1.08 |
| P content (mass %) | 0.94 | 0.82 | 0.64 | 1.43 | 1.86 | 0.95 | 1.01 |
| Carbon content (mass %) | <0.01 | <0.01 | <0.01 | <0.01 | <0.01 | 0.02 | 0.05 |
| Relative desulfurizing activity | 114 | 108 | 112 | 104 | 100 | 101 | 100 |

Analysis of Catalyst

Catalysts 6605, 6614, 6618, 6607, and 6610 were cut vertically in the direction of the length of the trilobe pellet form, and their cross sections were subjected to the line analysis by using an EPMA (electron beam probe microanalyzer) apparatus (scanning type JCMA33 produced by JEOL Ltd.). In the EPMA measurement, the electron beam was radiated onto the cross section with an acceleration voltage of 20 kV, a probe current of 0.1 μA, and a beam diameter of 10 μmφ to measure the generated characteristic X-rays in order to investigate the distributions of Mo, Co, Ni, Al, and P. The intensity ratios were obtained for Mo/Al, Co/Al, Ni/Al, P/Al, and Mo/P at intervals of 0.01 mm from the outer wall disposed at the tip to the outer wall of the recess disposed at the other end of the trilobe cross section. Table 3 shows values obtained by dividing the standard deviations by the average value. It is appreciated that the distributions of the carried metals such as molybdenum are uniform in Catalysts 6605 and 6614 as compared with the other catalysts.

TABLE 3

| | Catalyst # | | | | |
|---|---|---|---|---|---|
| | #6605 | #6614 | #6618 | #6607 | #6610 |
| Mo/Al | 0.199 | 0.169 | 0.267 | 0.254 | 0.238 |
| Co/Al | 0.169 | 0.129 | 0.224 | 0.192 | 0.136 |
| Ni/Al | 0.138 | 0.178 | 0.269 | 0.154 | 0.122 |
| P/Al | 0.259 | 0.191 | 0.228 | 0.437 | 0.135 |
| Mo/P | 0.182 | 0.308 | 0.357 | 0.207 | 0.288 |

Evaluation of Catalytic Activity

The catalysts shown in Table 2 were used to perform hydrorefining experiments by using vacuum gas oil originating from the Middle East as the feed oil. The nature of the feed oil was as follows. That is, the residual ash content was 0.57% by weight, the density was 0.9277 $g/cm^3$ the sulfur content was 2.51% by weight, the nitrogen content was 1060 weight ppm, the 10% distillation temperature was 314° C., the 50% distillation temperature was 410° C., and the 90% distillation temperature was 524° C. A reactor, which had an internal diameter of 2.5 cm and a length of 100 cm and which was filled with 100 $cm^3$ of the catalyst, was used for the reaction of the hydrorefining. A sulfurizing treatment was performed with oil obtained by dissolving 1% by weight of carbon disulfide in gas oil. The following condition was adopted for the hydrorefining. That is, the hydrogen purity was not less than 99.9%, the hydrogen pressure was 8.0 MPa, the liquid space velocity was 2.0 $hr^{-1}$, and the hydrogen/oil ratio was 230 NL/L. Sulfur contents of produced oils collected at reaction temperatures of 350° C., 370° C., and 390° C. were analyzed to determine the desulfurization reaction rate constants for the respective catalysts assuming that the reaction order was 1.5-order in relation to the desulfurization. Comparison was made assuming that Catalyst 6610 was the reference (100). Results are also shown in combination as relative desulfurizing activities in Table 2.

INDUSTRIAL APPLICABILITY

In the present invention, the carrier is brought into contact with the carrying solution which is within the specified pH range and which contains, in the specified ratio, cobalt or nickel, molybdenum, and phosphorus. The metal components contained in the carrying solution form the complex having the inherent structure. Owing to the complex, it is possible to allow the catalyst to have the excellent hydrorefining performance by carrying the metal components on the carrier.

The invention claimed is:

1. A method for producing a hydrorefining catalyst by bringing a carrying solution into contact with a carrier composed of an inorganic porous oxide, the hydrorefining catalyst containing molybdenum, phosphorus, cobalt and nickel and being for hydrorefining a vacuum gas oil distillate product, the method comprising the steps of:

preparing the carrying solution containing molybdenum, phosphorus, cobalt and nickel, and bringing the carrier into contact with the carrying solution, wherein:

a molar ratio of molybdenum with respect to phosphorus in the carrying solution is 2.5 to 7.0, a molar ratio of a total of molybdenum, cobalt, and nickel with respect to phosphorus is 3.5 to 9.0, and a molar ratio of molybdenum with respect to a total of cobalt and nickel is 1.9 to 2.8;

pH of the carrying solution is 2 to 5; and a Raman spectroscopy spectrum of the carrying solution has a peak top between 965 cm$^{-1}$ and 975 cm$^{-1}$.

2. The method for producing the hydrorefining catalyst according to claim 1, further comprising a step of calcinating the carrier in an oxidizing atmosphere after the step of bringing the carrier into contact with the carrying solution.

3. The method for producing the hydrorefining catalyst according to claim 1, wherein the Raman spectroscopy spectrum of the carrying solution has a peak top between 935 cm$^{-1}$ and 945 cm$^{-1}$, and the peak top between 965 cm$^{-1}$ and 975 cm$^{-1}$ is higher than the peak top between 935 cm$^{-1}$ and 945 cm$^{-1}$.

4. The method for producing the hydrorefining catalyst according to claim 1, wherein the Raman spectroscopy spectrum of the carrying solution has a peak top between 1040 cm$^{-1}$ and 1050 cm$^{-1}$ which is lower than the peak top between 965 cm$^{-1}$ and 975 cm$^{-1}$, or the Raman spectroscopy spectrum of the carrying solution has no peak top between 1040 cm$^{-1}$ and 1050 cm$^{-1}$.

5. The method for producing the hydrorefining catalyst according to claim 1, wherein the molar ratio of molybdenum with respect to phosphorus in the carrying solution is 4.1 to 6.5, the molar ratio of the total of molybdenum, cobalt, and nickel with respect to phosphorus is 5.0 to 9.0, and pH of the carrying solution is 3 to 5.

6. The method for producing the hydrorefining catalyst according to claim 1, wherein the composition ratio of the hydrorefining catalyst components is the same as the composition ratio of said components in the carrying solution.

7. A method for producing a hydrorefining catalyst by bringing a carrying solution into contact with a carrier composed of an inorganic porous oxide, the hydrorefining catalyst containing molybdenum, phosphorus, cobalt and nickel and being for hydrorefining a vacuum gas oil distillate product, the method comprising the steps of:

preparing the carrying solution containing molybdenum, phosphorus, cobalt and nickel, and bringing the carrier into contact with the carrying solution, wherein:

a molar ratio of molybdenum with respect to phosphorus in the carrying solution is 2.5 to 7.0, a molar ratio of a total of molybdenum, cobalt, and nickel with respect to phosphorus is 3.5 to 9.0, and a molar ratio of molybdenum with respect to a total of cobalt and nickel is 1.9 to 2.8;

the pH of the carrying solution is 2 to 5;

a Raman spectroscopy spectrum of the carrying solution has a peak top between 965 cm$^{-1}$ and 975 cm$^{-1}$, and the carrying solution does not contain inorganic or organic acids other than phosphoric acid.

8. The method for producing the hydrorefining catalyst according to claim 7, further comprising a step of calcinating the carrier in an oxidizing atmosphere after the step of bringing the carrier into contact with the carrying solution.

9. The method for producing the hydrorefining catalyst according to claim 7, wherein the Raman spectroscopy spectrum of the carrying solution has a peak top between 935 cm$^{-1}$ and 945 cm$^{-1}$, and the peak top between 965 cm$^{-1}$ and 975 cm$^{-1}$ is higher than the peak top between 935 cm$^{-1}$ and 945 cm$^{-1}$.

10. The method for producing the hydrorefining catalyst according to claim 7, wherein the Raman spectroscopy spectrum of the carrying solution has a peak top between 1040 cm$^{-1}$ and 1050 cm$^{-1}$ which is lower than the peak top between 965 cm$^{-1}$ and 975 cm$^{-1}$, or the Raman spectroscopy spectrum of the carrying solution has no peak top between 1040 cm$^{-1}$ and 1050 cm$^{-1}$.

11. The method for producing the hydrorefining catalyst according to claim 7, wherein the molar ratio of molybdenum with respect to phosphorus in the carrying solution is 4.1 to 6.5, the molar ratio of the total of molybdenum, cobalt, and nickel with respect to phosphorus is 5.0 to 9.0, and pH of the carrying solution is 3 to 5.

12. The method for producing the hydrorefining catalyst according to claim 7, wherein the composition ratio of the hydrorefining catalyst components is the same as the composition ratio of said components in the carrying solution.

* * * * *